UNITED STATES PATENT OFFICE.

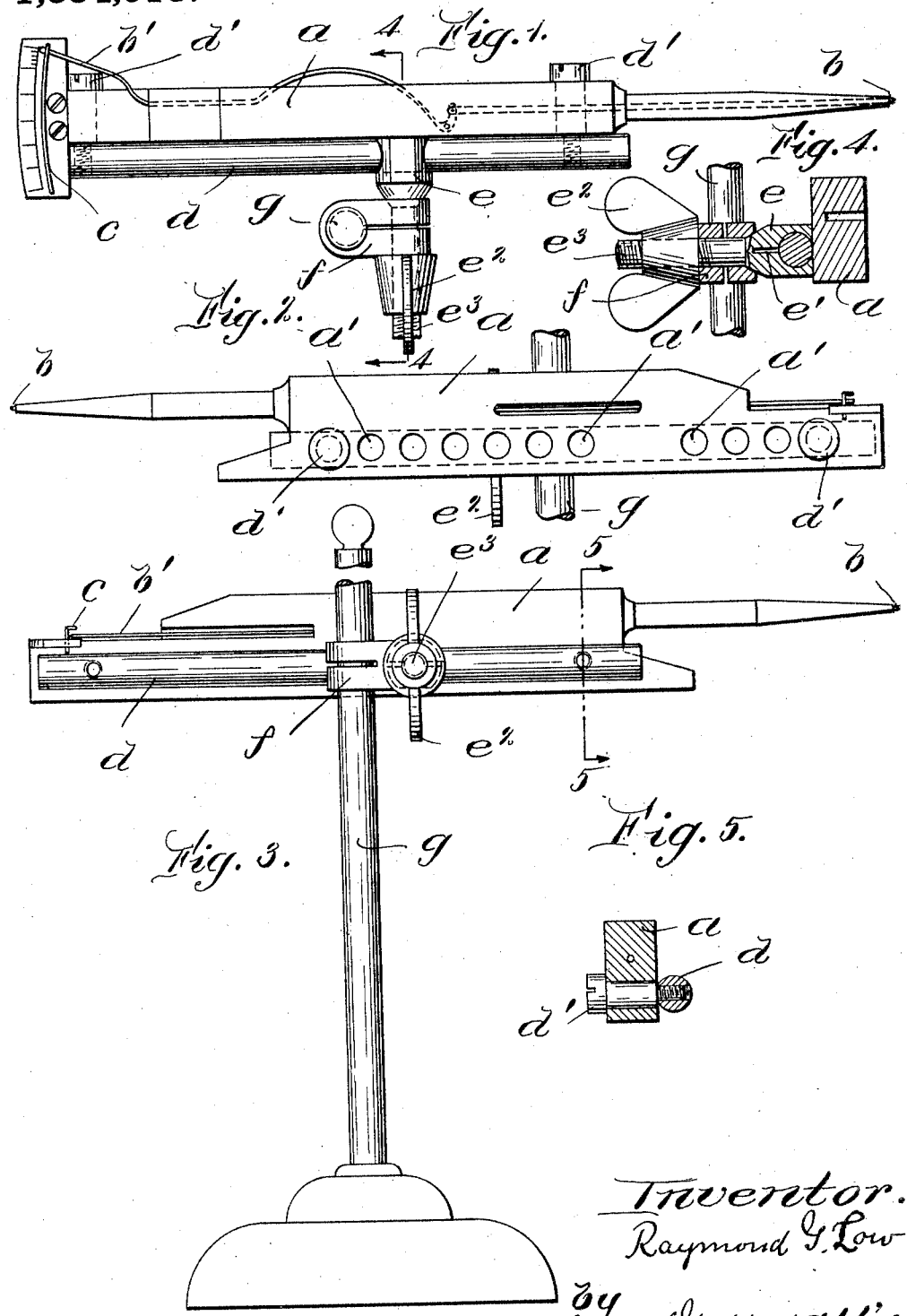

RAYMOND G. LOW, OF CAMBRIDGE, MASSACHUSETTS.

SURFACE-INDICATOR.

1,334,915.   Specification of Letters Patent.   Patented Mar. 23, 1920.

Application filed April 5, 1919. Serial No. 287,742.

*To all whom it may concern:*

Be it known that I, RAYMOND G. LOW, citizen of the United States, and resident of Cambridge, county of Middlesex, State of Massachusetts, have invented certain new and useful Improvements in Surface-Indicators, of which the following is a specification.

This invention relates to surface indicators of the so called Boulet type, such as shown in U. S. Patent No. 682,450, September 10, 1901, in which a perforated block having an indicator contact member working in coördination with a graduated scale is used to indicate and measure variations or unevenness in the surface to be measured.

In instruments intended for this class of work it is of great importance that the contact pointer or member be brought into measuring contact with different portions of the surface without disturbing the position of its supporting standard so as to get the various measurements from a single setting of the instrument. With the arrangements at present used, however, there must be more or less disturbance of the position of the standard in measuring many kinds of work since the adjustment is made through a series of pin-receiving holes spaced a substantial distance apart.

It is the object of the present invention to provide means whereby the required adjustments of the indicator block or body member can be made in an easy and convenient manner without shifting the position of the standard or necessitating changes in setting which may impair the accuracy of the measurements.

To this end the invention comprises, essentially, an indicator having its sensitive contact pointer and indicator working in connection with a graduated scale thereon in combination with a supporting carrier member extending longitudinally of said block and having sliding engagement with a clamping and supporting member that is properly mounted on the upright standard so that the necessary adjustments can be readily and accurately made.

This and other features of the invention will be explained in this specification and will be clearly defined in the claims hereto annexed.

In the accompanying drawings I have illustrated the preferred form embodying the principles of my present invention in which—

Figure 1 is a plan view showing the means for mounting and supporting the indicator in accordance with my invention;

Fig. 2 is a horizontal elevation of one side of the indicator block;

Fig. 3 is an elevation showing the opposite side of the block together with the supporting standard;

Fig. 4 is a cross-sectional view through the block supporting and clamping member; and Fig. 5 is a detail in cross section of the indicator block and its carrier rod.

In the practice of this invention according to the form illustrated in the drawings, the indicator block $a$ is of the usual construction carrying the sensitive contact member $b$ having operative connection with the pointer $b'$ which moves along the graduated scale $c$ which indicates thousandths or any other small fraction of an inch.

Along one side of the indicator block or body member $a$ is secured a carrier rod $d$ which in this case is of circular cross section and is provided with properly spaced tapped holes to receive the threaded ends of the fastening and supporting screws $d'$, which screws are passed through two of the transverse apertures $a'$ so as to firmly secure the carrier rod $d$ to the block $a$.

The carrier rod is supported so as to permit longitudinal adjustment by means of the clamping and supporting member $e$ whose head is split or severed and is transversely bored to fit snugly around the carrier $d$. The outer portion of the head of the clamping member $e$ is beveled to fit into a counter-bored aperture in the vertically adjustable clamp $f$ mounted on the standard $g$. The shank $e^3$ of the clamping member $e$ is threaded to receive a thumb nut $e^2$ by the tightening of which the beveled end of the head is forced into the conical seat in the clamp $f$ so as to spring the two jaws together into clamping or gripping engagement with the carrier rod $d$ in any desired position of adjustment.

By merely slackening the nut $e^2$ the clamping member $e$ is released from its retaining grip on the carrier rod $d$ thereby permitting the carrier rod and block $a$ to be shifted to any desired extent to bring the contact pointer $b$ into contact with the surface to be measured, and this sliding adjustment whether for a substantial distance or a very minute distance makes it entirely unnecessary to shift the position of the standard $g$ so that all the desired measurements may be taken from a single setting of the standard on the work.

It will be observed that the tightening of the thumb nut or wing nut $e^2$ serves not only to pinch together the jaws of the split head of the clamping member $e$ but also serves to draw the jaws of the split supporting member $f$ tightly upon the upright standard so that a vertical adjustment along the standard is permitted at the same time if desired. Since the carrier rod $d$ is detachably connected with the indicating device proper it is possible to substitute a rod of any desired length in case extra length is needed on special kinds of work.

The clamping member $e$ by partly encircling the carrier rod forms in effect a dove-tail sliding connection coupling the indicator device with the supporting standard and permits the widest and minutest possible range of adjustment.

It will be seen that the ends of the clamping jaws of the head $e$ form flat surfaces abutting against the lateral face of the body or block $a$ of the gage so as to prevent the oscillation or rocking of the gage upon the central axis of the carrier rod thereby preserving the accurate alinement and positioning of the gage.

What I claim is:

1. The combination with a micrometer surface gage comprising essentially an elongated body and a sensitive micrometer indicator operatively mounted thereon, of a carrier rod detachably secured to one side of said body and extending longitudinally thereof, a clamping support whose jaws partly surround said carrier rod to form a sliding dove-tail engagement therewith, and means for frictionally clamping said jaws upon said carrier rod in different positions of adjustment to hold said gage securely in any desired position, said clamping support being provided with supplemental jaws for adjustably securing it on a vertical standard, substantially as described.

2. The combination with a micrometer surface gage embracing an elongated body member and a sensitive indicating pointer operatively mounted thereon, a carrier rod securely fastened against one side of said body member by fastening screws passed through transverse apertures in said body member, a clamping support embracing a split head forming opposed jaws fitting around said carrier rod to grip the same in its different positions of longitudinal adjustment, said clamping jaws being formed with their ends abutting against the flat surface of the body member to hold the same against rotative displacement in the clamping jaws, said clamping support being provided with means for gripping and engaging the vertical standard, substantially as described.

3. A micrometer surface gage embracing in its construction an elongated body member and a sensitive indicating pointer operatively mounted thereon, a carrier rod rigidly secured to one side of said body member and extending longitudinally thereof, a clamping support having sliding dove-tail gripping engagement with said carrier rod to grip said carrier rod in various positions of longitudinal adjustment, supplemental clamping jaws for adjustably gripping a vertical standard, and a hand nut for tightening the two sets of clamping jaws in order to firmly hold the gage in any desired position of adjustment, substantially as described.

In witness whereof, I have subscribed the above specification.

RAYMOND G. LOW.